Patented Feb. 3, 1948

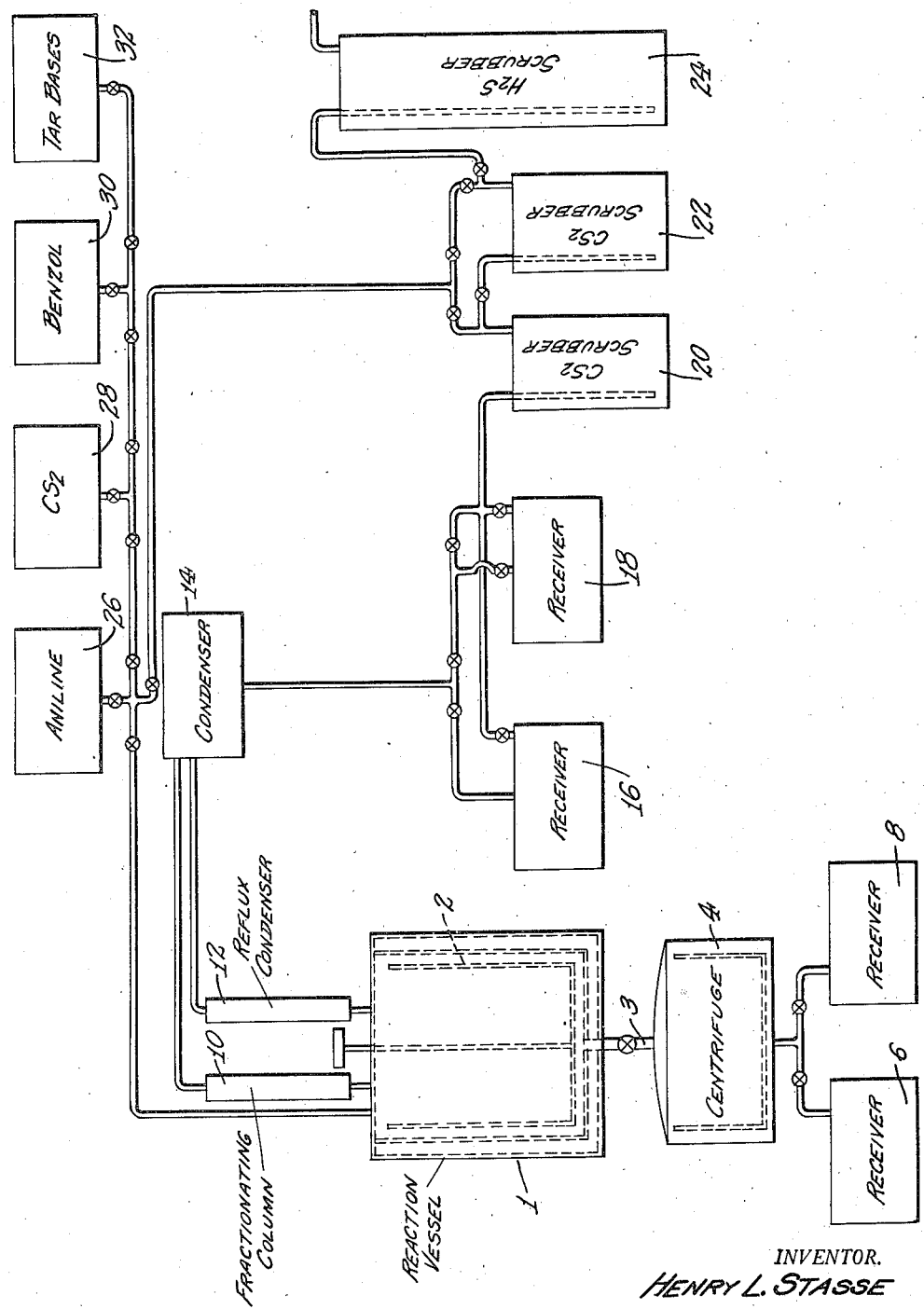

2,435,295

UNITED STATES PATENT OFFICE 2,435,295

PREPARATION OF THIOCARBANILIDE AND ITS HOMOLOGS

Henry L. Stasse, Hawthorne, N. J., assignor to Allied Chemical & Dye Corporation, New York, N. Y., a corporation of New York Application May 18, 1945, Serial No. 594,492

9 Claims. (Cl. 260—552)

This invention relates to the production of thiourea derivatives, and more particularly to an improved process for reacting aniline and toluidines with carbon disulfide to produce thiocarbanilide and its methyl homologs.

The manufacture of thiocarbanilide and dimethylthiocarbanilides by reaction of carbon disulfide with aniline and toluidines, respectively, is well known. These reactions may be represented as follows:

$$2C_6H_5NH_2 + CS_2 \longrightarrow C_6H_5NH\overset{S}{\underset{\|}{C}}NHC_6H_5 + H_2S$$

$$2CH_3C_6H_4NH_2 + CS_2 \longrightarrow CH_3C_6H_4NH\overset{S}{\underset{\|}{C}}NHC_6H_4CH_3 + H_2S$$

However, the reactions proceed slowly and unless a diluent such as alcohol is employed, the products crystallize forming stiff masses which cannot easily be stirred. Various expedients have been proposed for the purpose of increasing the speed of the reaction and improving the yields of the desired products. For example, it has been proposed to add sulfur polysulfides, sulfur chlorides and pyridine to reaction mixtures for this purpose.

It is an object of this invention to provide an improved process for the manufacture of thiocarbanilide and methyl homologs thereof by reaction of aniline and toluidines, respectively, with carbon disulfide.

It is a further object of the invention to provide a novel process of reacting carbon disulfide with aniline and toluidines whereby high yields of thiocarbanilide and dimethylthiocarbanilides are obtained in relatively short reaction times. Other objects and advantages will appear hereinafter.

In accordance with the invention, carbon disulfide is reacted with aniline or toluidines, or both of these types of these amines, in the presence of organic base material containing the pyridine nucleus boiling within the range of 150° to 210° C. At least 10%, preferably from 25% to 80%, of organic bases containing the pyridine nucleus based on the weight of the amine and at least one mol, preferably from 1½ to 2½ mols, of carbon disulfide for each mol of amine are utilized.

I have found that by carrying out the reaction in the presence of such organic bases containing the pyridine nucleus, materially higher yields of thiocarbanilide and methyl homologs thereof are obtainable within a shorter reaction time than are obtainable if lower or higher boiling organic bases, e. g., pyridine and quinoline, are utilized. For example, from 90% to 95% or 98% thiocarbanilide yields are obtainable in accordance with the invention within a reaction period of from 6 or 8 to 12 hours.

The organic bases employed in conjunction with the aniline or toluidine and carbon disulfide may be substantially pure materials such as 2,4-lutidine or 2,4,6-collidine, or commercial mixtures of bases containing the pyridine nucleus boiling within the range of 150° to 210° C. may be utilized. Such mixtures are constituted chiefly of alkyl pyridines. Instead of mixing pure aniline or toluidine with the alkyl pyridines, these materials may be simultaneously extracted from coaltar distillate containing them, e. g., a carbolic hiflash fraction, and the extracted bases distilled to obtain a cut containing the desired proportion of aniline and bases involving the pyridine nucleus. For example, I have found a fraction of bases derived from coal tar boiling within the range of 180° to 185° C. and containing 50% to 80% by weight of aniline, the remainder being chiefly alkyl pyridines, to be eminently suitable for carrying out the invention. Fractions of coal tar bases boiling within the range of 190° to 210° C., containing similar percentages of toluidines, the remainder being chiefly alkyl pyridines, may also be advantageously employed. It will be appreciated that any of the three isomeric toluidines or mixtures thereof may be utilized. Further mixtures of aniline and one or more of the toluidines, e. g., tar base fractions boiling within the range of 180° to 210° C. containing aniline as well as the toluidines, may be employed, in which case a mixture of thiocarbanilide and monomethyl and dimethyl homologs thereof may be obtained as the reaction product.

The accompanying drawing is a flow sheet showing diagrammatically one arrangement of apparatus which may be employed for practicing the invention.

In the drawing the reference numeral 1 designates a jacketed reaction vessel equipped with a rotary agitator 2, and a valved outlet 3 communicating with centrifuge 4 which discharges through valved conduits into receivers 6 and 8. The reaction vessel is also equipped with a fractionating column 10 and a reflux condenser 12 communicating with condenser 14 which discharges through valved conduits into either of two receivers 16 and 18 or directly to carbon disulfide scrubbers 20 and 22 containing aniline or toluidine. The carbon disulfide scrubbers communicate with hydrogen sulfide scrubber 24 containing a solution of lime or caustic alkali, e. g., caustic soda, for absorbing hydrogen sulfide liberated during the reaction. Reference numerals 26, 28, 30 and 32 designate containers for aniline (or toluidine), carbon disulfide, a solvent such as benzene and tar bases, respectively, which containers communicate with the reaction vessel through a valved conduit system as shown on the drawing, whereby the desired amounts of these materials may be introduced into the vessel. The conduit system is arranged to permit discharge of aniline or toluidine from container 26 into either or both of carbon disulfide scrubbers 20 and 22.

The invention may be carried out, for example, by refluxing aniline with, say 2 mols of carbon disulfide and about 25 to 80 percent, based on the weight of the aniline, of organic base material containing the pyridine nucleus boiling within the range of 150° to 210° C., preferably 160° to 190° C., while agitating the mixture slowly. Most of the carbon disulfide vapors are condensed in reflux condenser 12 and returned to the reaction vessel. The remainder, together with the liberated hydrogen sulfide, are passed through the scrubbers 20, 22 containing aniline where the carbon disulfide is absorbed. The unabsorbed hydrogen sulfide passes to scrubber 24 where it is absorbed by caustic soda or lime solution. After the reaction is substantially complete, which ordinarily requires about 6 to 12 hours, the reaction mixture is cooled, e. g., to about 5°–15° C., to crystallize the thiocarbanilide and is then filtered or centrifuged to separate the thiocarbanilide crystals from the mother liquor. The crystals are washed with a solvent such as benzene to remove adherent mother liquor. The mother liquor is returned to the reaction vessel with sufficient fresh aniline, tar bases and carbon disulfide to give the desired proportions of materials and the reaction repeated. The aniline-containing absorbed carbon disulfide from the carbon disulfide scrubbers 20 and 22 may furnish a portion of the aniline and carbon disulfide content of the reaction charge.

The tar bases containing the pyridine nucleus may be used repeatedly in this manner until impurities build up to an extent such that they objectionably affect the quality of the thiocarbanilide, whereupon the mother liquor is distilled in the reaction vessel, preferably at a temperature not above 100° C., to separate carbon disulfide therefrom. The liquor is then subjected to distillation under vacuum (absolute pressure of from 1" to 2" of mercury) or steam distillation to remove the tar bases, and the distillation is discontinued when a thick mass of thiocarbanilide crystals form. Sufficient benzene is added to the crystals to form a slurry, which is then cooled to 5°–15° C. to crystallize additional thiocarbanilide, filtered or centrifuged to separate the thiocarbanilide crystals from the liquor, and the filtrate collected in receivers 6 and 8. The crystals may be washed with benzene or water. The filtrate liquor is fractionally distilled under vacuum, say an absolute pressure of 1" to 2" of mercury, to separate the benzene and bases from the impurities which are left as residue. The purified bases may be re-utilized in the process. The distillation may be conducted in reaction vessel 1 and the benzene and tar bases collected separately in receivers 16 and 18.

When a tar-base fraction containing the desired proportions of aniline and tar bases involving the pyridines nucleus is utilized, the reaction may be carried out as hereinabove described and when it is complete the unreacted carbon disulfide is distilled off from the reaction mixture, preferably at a temperature not above 100° C., and collected in receiver 16 or 18. From 100% to 200% of benzene based on the weight of the aniline content of the tar-base fraction is added to the mixture, the mixture is then cooled, e. g., to 5°–15° C., to crystallize the thiocarbanilide and the crystals are separated from the liquor by centrifuging or filtration. The benzene is separated from the tar bases by distillation at a temperature not above 130° C. and the bases and thiocarbanilide dissolved therein may then be recovered by vacuum or steam distillation and treatment with benzene as described in the preceding paragraph. The recovered bases may be utilized in any desired manner. For example, they may be employed in conjunction with substantially pure aniline and carbon disulfide for thiocarbanilide production.

If the thiocarbanilide crystals have an objectionable odor or contain objectionable impurities, they may be further purified by recrystallization from a solvent such as benzene.

When using tar base mixtures of high aniline content, i. e., 75% or more, the reaction mixture may be diluted with a suitable solvent before carrying out the reaction. This procedure facilitates agitation of the heavy slurry of crystals which is produced. As diluents, aliphatic, acyclic and aromatic hydrocarbons, preferably sufficiently volatile to permit ready removal thereof from the tar bases by distillation, may be employed. Aromatic hydrocarbons such as benzene, toluene and xylene and mixtures thereof are preferably employed for this purpose. Such solvents may also be utilized instead of benzene in the procedure hereinabove described.

The above procedure is also applicable to the reaction of toluidines with carbon disulfide to produce dimethyl-thiocarbanilides.

The following examples are further illustrative of the invention:

*Example 1.*—200 parts by weight of aniline, 135 parts by weight of a mixture of alkyl pyridines boiling within the range of 180° to 185° C. and 250 parts by weight of carbon disulfide were refluxed together in a reaction vessel equipped with a reflux condenser and an agitator for 8 hours while agitating the reaction mixture slowly. The vapors escaping from the reflux condenser were passed through a scrubber containing aniline to absorb the carbon disulfide and then through a scrubber in which an aqueous solution of sodium hydroxide was circulated to absorb the hydrogen sulfide. The reaction mixture was then cooled to 5° to 10° C. to crystallize the thiocarbanilide, filtered to separate the crystals from the mother liquor and the crystals were washed with benzene and dried at 60° to 65° C. The mother liquor was returned to the reaction vessel together with the aniline (containing carbon disulfide) from the carbon disulfide scrubber and sufficient additional aniline and carbon disulfide to form the desired reaction mixture, and the above procedure was repeated until the mother liquor contained sufficient impurities to lower the purity of the thiocarbanilide objectionably.

The mother liquor was then distilled at atmospheric pressure at a still temperature not exceeding 100° C. until the unreacted carbon disulfide was distilled off, and 600 parts by weight of benzene were added to the liquor which was then cooled to 5°–15° C. For this purpose benzene which has previously been used for washing thiocarbanilide crystals may be employed. The liquor was filtered to separate the crystals therefrom and was then distilled at atmospheric pressure at a still temperature not exceeding 130° C. to separate the benzene from the tar bases. The residue was fractionated under absolute pressure of 1" of mercury at a still temperature not exceeding 130° C. and the residual benzene and tar bases were collected separately as distillate. The distillation was discontinued when a heavy mass of thiocarbanilide crystals formed. Sufficient benzene was added to the crystals to form a slurry, the mixture cooled to 5°–15° C., filtered, the crystals washed with benzene and dried at 60° to 65° C. The filtrate containing the benzene and a small amount of tar bases was fractionally distilled first at atmospheric pressure and then under absolute pressure of about 1" of mercury to separate the benzene and bases from the impurities which remained as residue. From 95% to 98% of the theoretical yield of thiocarbanilide crystals having a melting point of 153° to 153.5° C. were obtained.

*Example 2.*—250 parts by weight of a fraction of tar bases boiling within the range of 180° to 185° C. containing 78% by weight of aniline and 22% of tar bases involving the pyridine nucleus were reacted with 250 parts of carbon disulfide as described in Example 1. The unreacted carbon disulfide was then removed from the reaction mixture by distillation at a still temperature not exceeding 100° C., and 250 parts by weight of benzene were added to the mixture which was then cooled to 15° C. The mixture was filtered to separate thiocarbanilide crystals from the liquor, the crystals were washed with benzene and dried at 60° to 65° C.

The mother liquor filtrate was distilled under atmospheric pressure at a temperature not exceeding 130° C. to separate benzene therefrom, the residue was fractionated under pressure of 1" of mercury at a still temperature not exceeding 130° C., and the tar bases and residual benzene were collected separately as distillate. The distillation was discontinued when a heavy mass of thiocarbanilide crystals formed, sufficient benzene was added to slurry the residue, the mixture was cooled to 15° C., filtered, and the crystals washed with benzene and dried at 60° to 65° C. A thiocarbanilide yield of 98% of theoretical was obtained. The thiocarbanilide crystals had a melting point of 153° to 153.5° C. The filtrate was distilled under vacuum to separate the benzene and the remainder of the bases from impurities, which remain in the still as residue. The recovered bases may be employed for any desired purpose. For example, they may be utilized in conjunction with substantially pure aniline for the production of thiocarbanilide.

Thus it will be seen that the invention provides a novel process for reacting aniline and toluidines with carbon disulfide to obtain high yields of thiocarbanilide and dimethyl-thiocarbanilides in a relatively short reaction time. As hereinabove pointed out, substantially higher yields of reaction products are obtainable in a shorter reaction time than are obtainable if bases containing the pyridine nucleus boiling below 150° C. or above 210° C. are utilized. The boiling points referred to herein are at pressure of 760 mm. of mercury.

Since certain changes may be made without departing from the scope of the invention, it is intended that the above shall be interpreted as illustrative and not in a limiting sense.

I claim:

1. A process for the production of a member of the group consisting of thiocarbanilide and its methyl homologs which comprises reacting a member of the group consisting of aniline and toluidines with carbon disulfide in the presence of organic bases containing the pyridine nucleus boiling within the range of 150° to 210° C.

2. A process of producing a member of the group consisting of thiocarbanilide and dimethyl-thiocarbanilides which comprises reacting an amine of the group consisting of aniline and toluidines with carbon disulfide in the presence of from 25% to 80%, based on the weight of the amine, of organic bases containing the pyridine nucleus boiling within the range of 150° to 210° C. with from 1 to 2½ mols of carbon disulfide for each mol of the amine, and heating the mixture until the reaction is substantially complete.

3. A process of producing thiocarbanilide as defined in claim 2 in which the amine is aniline, said process including the further steps of cooling the reaction mixture to crystallize thiocarbanilide, separating the crystals from the liquor and reacting additional carbon disulfide and aniline in the presence of the liquor.

4. A process of producing thiocarbanilide which comprises mixing carbon disulfide with a mixture of aniline and from 25% to 80%, based on the weight of the aniline, of organic bases containing the pyridine nucleus, said bases boiling within the range of from 150° to 210° C., the carbon disulfide being present in proportions of from 1 to 2½ mols for each mol of the aniline, and refluxing the reaction mixture for from 6 to 12 hours.

5. A process as defined in claim 4 involving the additional steps of separating unreacted carbon disulfide from the reaction mixture, adding benzene to the reaction mixture and cooling the mixture to crystallize thiocarbanilide.

6. A process as defined in claim 4 involving the additional steps of separating unreacted carbon disulfide from the reaction mixture, adding benzene to the mixture, cooling the mixture to crystallize thiocarbanilide, separating the crystals from the liquor, and distilling the liquor at a temperature not exceeding 130° C. to recover the benzene, tar bases and additional thiocarbanilide.

7. A process of producing thiocarbanilide which comprises mixing carbon disulfide with a coaltar-base fraction constituted substantially of aniline and from 25% to 80%, based on the weight of the aniline, of bases containing the pyridine nucleus boiling within the range of from 180° to 185° C., the carbon disulfide being present in proportions of from about 1 to 2½ mols for each mol of the aniline, refluxing the mixture until the reaction is substantially complete, distilling the mixture at a temperature not exceeding 100° C., until unreacted carbon disulfide is substantially completely removed therefrom, diluting the mixture with benzene, cooling the mixture to a temperature not above 15° C. to crystallize thiocarbanilide, and separating the crystals from the liquor.

8. A process as defined in claim 7 involving the additional steps of distilling the liquor at a temperature not above 130° C. to separate benzene therefrom, distilling the residue under vacuum at a temperature not exceeding 130° C. to remove the tar bases and crystallize substantially all of the thiocarbanilide, adding sufficient benzene to the crystals to form a slurry and filtering the slurry to separate the crystals from the benzene.

9. A process as defined in claim 7 in which the reaction between the carbon disulfide and aniline is carried out in the presence of benzene.

HENRY L. STASSE.

REFERENCES CITED

The following references are of record in the file of this patent:

UNITED STATES PATENTS

| Number | Name | Date |
| --- | --- | --- |
| 1,477,804 | Bedford et al. | Dec. 18, 1923 |
| 1,482,317 | O'Brien | Jan. 29, 1924 |
| 1,549,426 | Weiss | Aug. 11, 1925 |
| 2,106,552 | Jenkins et al. | Jan. 25, 1938 |
| 1,688,707 | Hand et al. | Oct. 23, 1928 |

FOREIGN PATENTS

| Number | Country | Date |
| --- | --- | --- |
| 307,906 | Great Britain | Feb. 20, 1930 |